(12) United States Patent
Zhou

(10) Patent No.: US 8,567,739 B2
(45) Date of Patent: Oct. 29, 2013

(54) SUPPORT APPARATUS FOR SUPPORTING DEVICE

(75) Inventor: Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 47 days.

(21) Appl. No.: 13/278,055

(22) Filed: Oct. 20, 2011

(65) Prior Publication Data

US 2012/0211633 A1 Aug. 23, 2012

(30) Foreign Application Priority Data

Feb. 18, 2011 (CN) .......................... 2011 1 0040760

(51) Int. Cl.
*F16M 13/00* (2006.01)
(52) U.S. Cl.
USPC ........... 248/397; 248/127; 248/284.1; 16/326
(58) Field of Classification Search
USPC ................. 248/397, 127, 284.1, 917; 16/326; 402/92, 161, 297, 96
See application file for complete search history.

(56) References Cited

U.S. PATENT DOCUMENTS

| | | | | |
|---|---|---|---|---|
| 1,320,439 | A * | 11/1919 | Andresiak | 248/447.2 |
| 5,109,411 | A * | 4/1992 | O'Connell | 379/454 |
| 5,392,350 | A * | 2/1995 | Swanson | 379/446 |
| 5,620,272 | A * | 4/1997 | Sheng | 403/96 |
| 6,244,553 | B1 * | 6/2001 | Wang | 248/278.1 |
| 6,343,406 | B1 * | 2/2002 | Yeh | 16/328 |
| 7,303,171 | B1 * | 12/2007 | Chen | 248/184.1 |
| 7,431,250 | B2 * | 10/2008 | Chen | 248/205.5 |
| 8,091,843 | B2 * | 1/2012 | Tsai | 248/206.2 |
| 8,302,920 | B2 * | 11/2012 | Tsai | 248/206.3 |
| 8,317,152 | B1 * | 11/2012 | Zhou | 248/596 |

* cited by examiner

*Primary Examiner* — Anita M King
(74) *Attorney, Agent, or Firm* — Altis & Wispro Law Group, Inc.

(57) ABSTRACT

A connection mechanism is used for rotatably connecting a first object and a second object. The connection mechanism includes a positioning member capable of being inserted in a first fixing hole defined in the first object and the engaging hole defined in the second object for connecting the first object and the second object. The positioning member is slidable in the first fixing hole and in the engaging hole to interchange between a first position and a second position, the positioning member is received in the first fixing hole and the engaging hole to restrict the first object from rotating relative to the second object in the first position, and at least move out of the first fixing hole or the engaging hole to allow the first object to rotate relative to the second object in the second position.

20 Claims, 5 Drawing Sheets

SUPPORT APPARATUS FOR SUPPORTING DEVICE

BACKGROUND

1. Technical Field

The present disclosure relates to support apparatuses.

2. Description of Related Art

Many hand-held electronic devices, such as mobile phones or tablet computers, can be supported by some mechanisms in an upright position on a support surface. However, many support mechanisms are not adjustable and so may not provide the best viewing angle in various circumstances for users.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
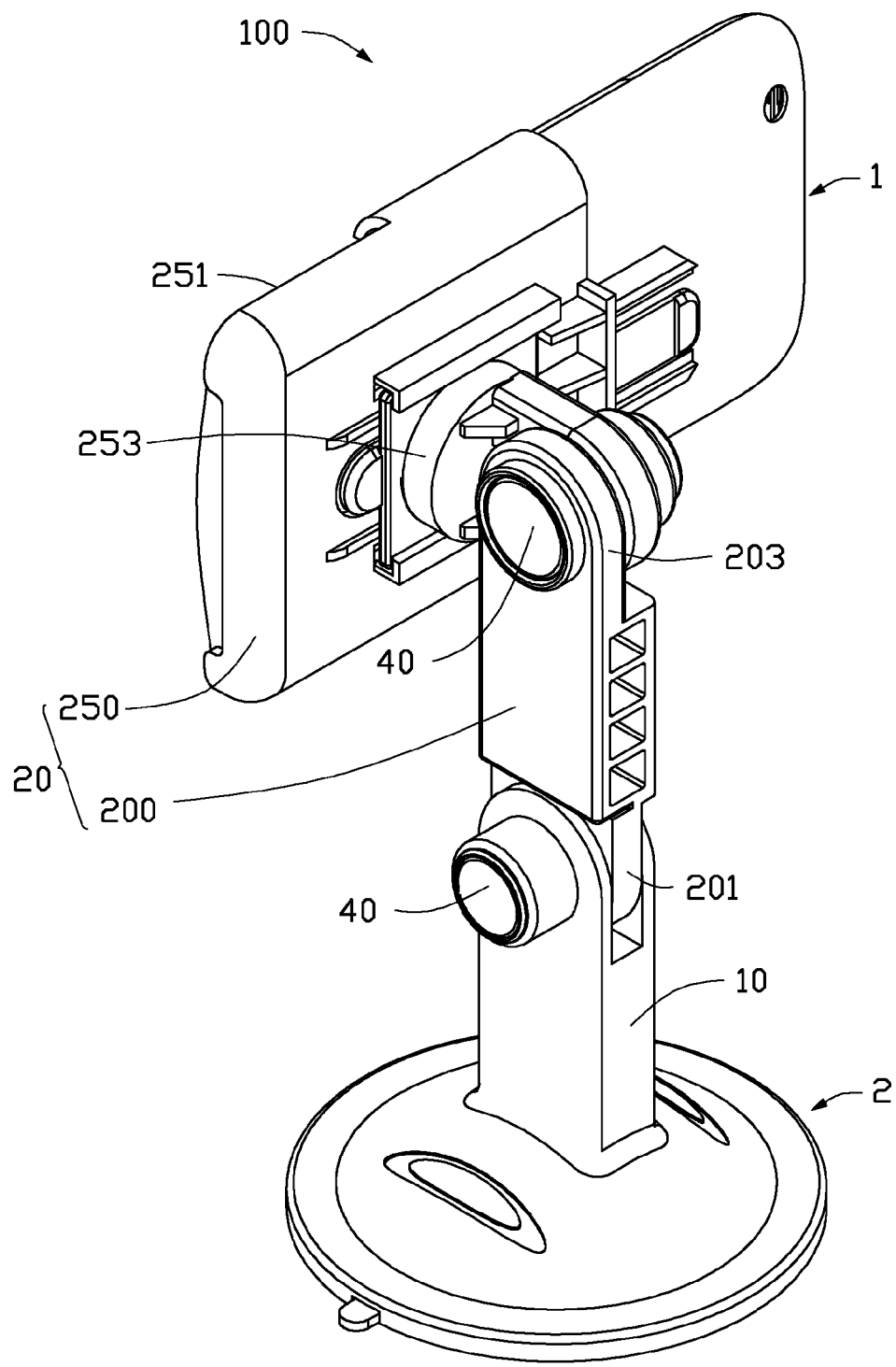
FIG. 1 is a perspective view of a support apparatus for supporting a device in accordance with an embodiment.

Referring to FIG. 1, an electronic apparatus 100 includes a device 1 and a support apparatus 2 for supporting the device 1 on a support surface. In some embodiments, the device 1 may be a mobile phone or a tablet computer. The support apparatus 2 includes a base 10, a main body 20, and two connection mechanisms 40. The main body 20 includes a support member 250 and a connection arm 200 with two ends thereof respectively and rotatably connected to the base 10 and the support member 250 via one of the connection mechanisms 40.

Figure 2:
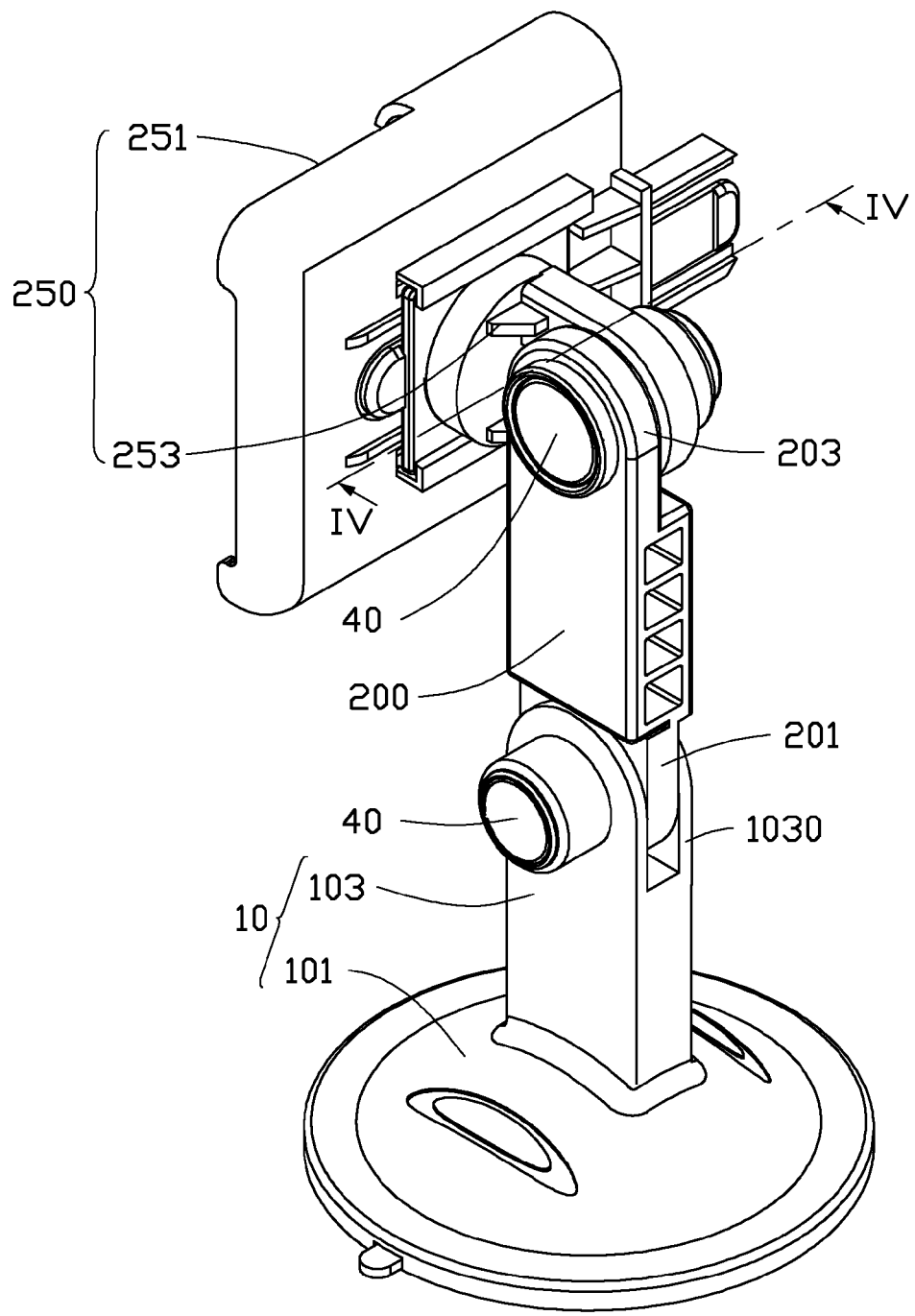
FIG. 2 is a perspective view of the support apparatus of FIG. 1.
Figure 3:
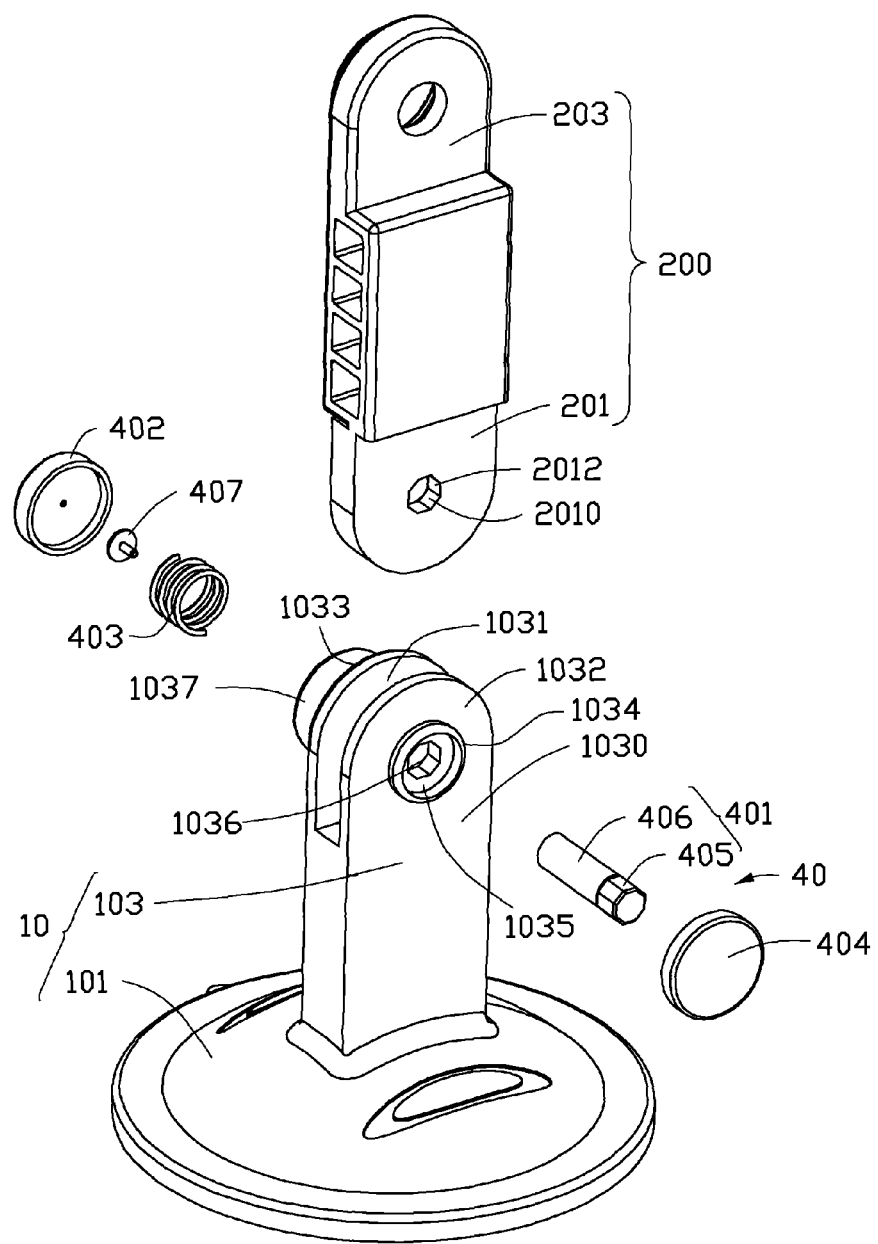
FIG. 3 is a disassembled view of the support apparatus of FIG. 2.

Referring to FIGS. 2 and 3, the base 10 includes a bottom portion 101 and a post 103 protruding upwards from the bottom portion 101. The post 103 includes an end portion 1030 away from the bottom portion 101 and is rotatably coupled to the connection arm 200. In some embodiments, the end portion 1030 is substantially arch shaped and defines an opening 1031 partially surrounded by two opposite sidewalls 1032 and 1033. A cylindrical first receiving portion 1034 protrudes from the sidewall 1032 defining a first receiving hole 1035 and the sidewall 1032 defines a polygonal first fixing hole 1036 communicating with the first receiving portion 1034. A second receiving portion 1037 protrudes from the sidewall 1033 defining a second receiving hole 1038 (shown in FIG. 4) and the sidewall 1033 defines a circular second fixing hole 1039 communicating with the second receiving portion 1037. The second fixing hole 1039 is coaxial with and smaller than the first fixing hole 1036.

Figure 4:
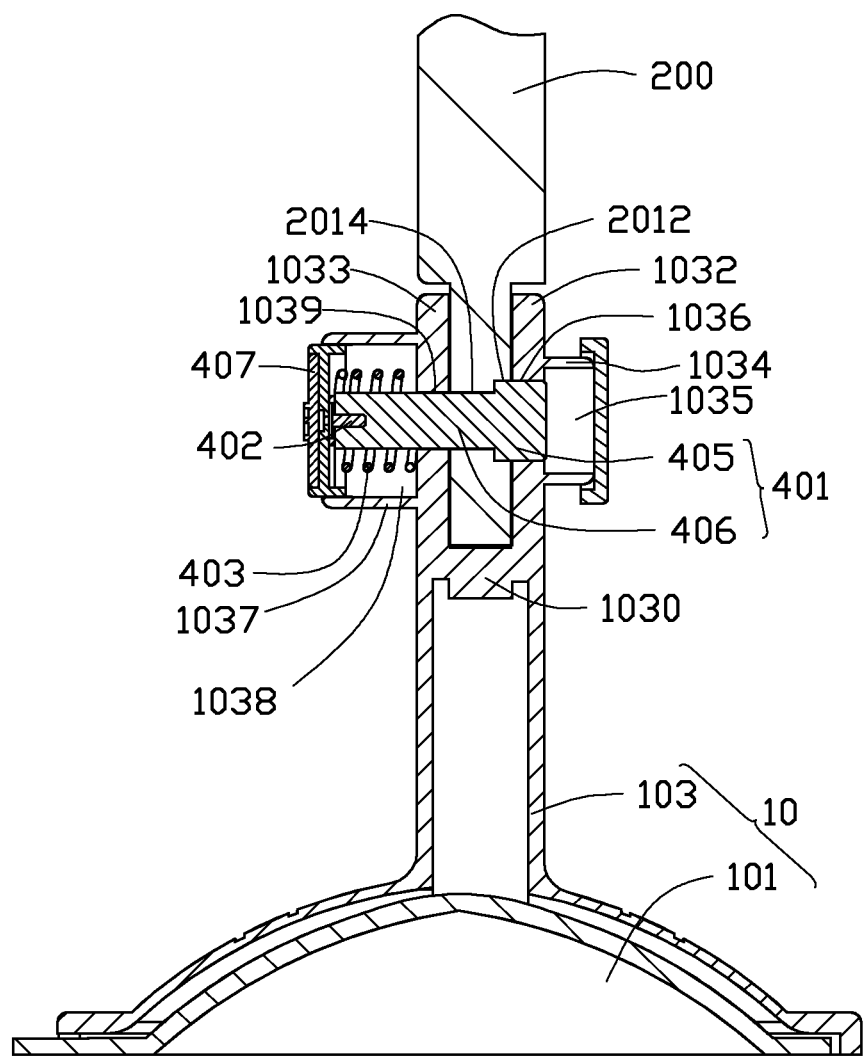
FIG. 4 is a cross-section view of the support apparatus of FIG. 2 in a first state taken along line IV-IV.
Figure 5:
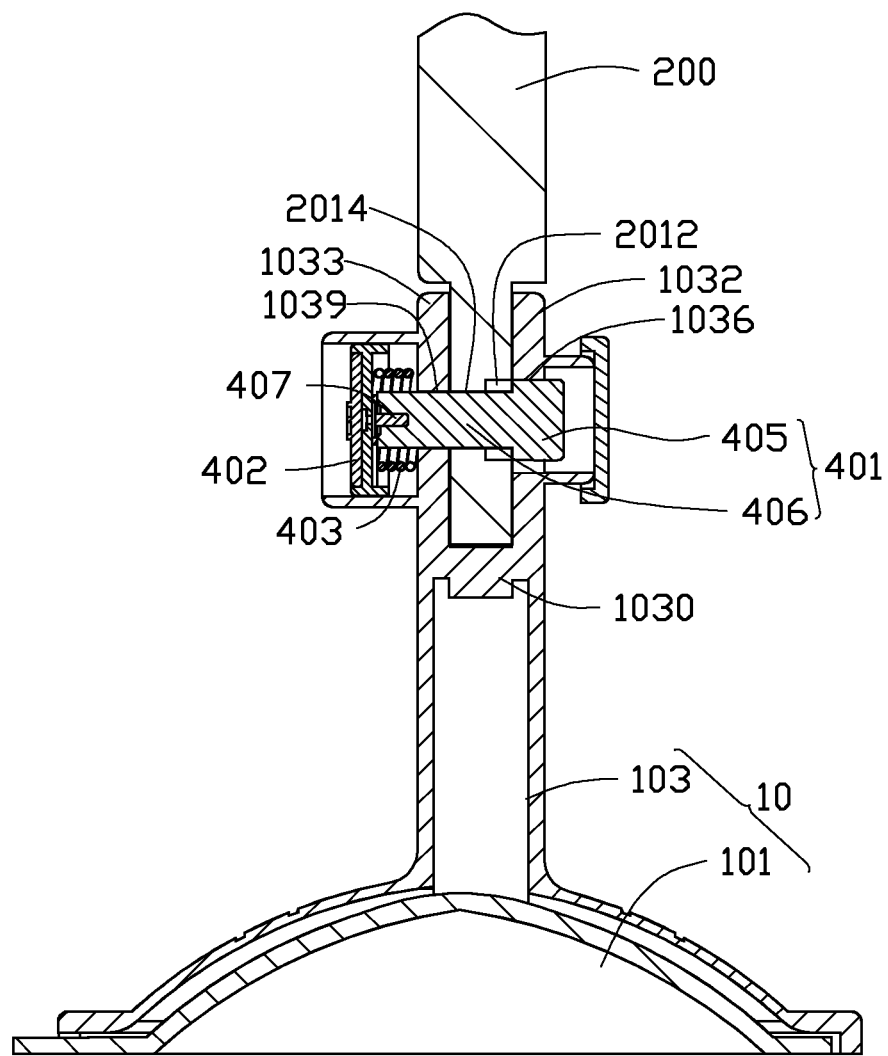
FIG. 5 is similar to FIG. 4 but with the support apparatus in a second state.

The connection arm 200 includes a first engaging portion 201 rotatably connected to the end portion 1030, and a second engaging portion 203 opposite to the first engaging portion 201. The first engaging portion 201 is capable of being inserted in the opening 1031. The first engaging portion 201 further defines an engaging hole 2010. As shown in FIG. 4, the engaging hole 2010 includes a first engaging hole portion 2012 and a second engaging hole portion 2014 communicating with the first engaging hole portion 2012. The first engaging hole portion 2012 is substantially polygonal and equal to the first fixing hole 1036. The second engaging hole portion 2014 is substantially circular and equal to the second fixing hole 1039.

Each connection mechanism 40 includes a positioning member 401, a first cover 402, an elastic member 403, and a second cover 404. The first cover 402 and the second cover 404 are respectively connected to opposite ends of the positioning member 401. The elastic member 403 is sleeved on the positioning member 401 with one end being secured to the first cover 402.

The positioning member 401 is slidable relative to the post 103 and the connection arm 200 to switch between a first position to restrict the connection arm 200 from rotating relative to the post 103, and a second position to allow the connection arm 200 to rotate relative to the post 103. The positioning member 401 includes a positioning portion 405 and a rod 406 connected to one end of the positioning portion 405. The positioning portion 405 is substantially polygonal and partly corresponds to the first fixing hole 1036 and partly corresponds to the first engaging hole portion 2012. The rod 406 partly corresponds to the second engaging hole portion 2014 and partly corresponds to the second fixing hole 1039. The rod 406 is long enough to be wholly inserted in the second engaging hole portion 2014 and the second fixing hole 1039 in order and partly extended out of the sidewall 1033.

The first cover 402 is connected to the part of the rod 406 extending out of the sidewall 1033 and is received in the second receiving hole 1038. The first cover 402 is movable in the second receiving hole 1038. The elastic member 403 is sleeved on the part of the rod 406 extending out of the sidewall 1033. The second cover 404 is capable of being clasped on the first receiving portion 1034.

The support member 250 includes a holding portion 251 for holding the device 1 and a connection portion 253 protruding from the holding portion 251. The connection portion 253 is rotatably connected to the second engaging portion 203 via one connection mechanism 40. The connection means between the connection arm 200 and the support member 250 is the same as that for the connection arm 200 and the base 10, and is described as follows.

In assembly, the first engaging portion 201 of the connection arm 200 is inserted into the opening 1031, with the first engaging hole portion 2012 aligned with the first fixing hole 1036, and the second engaging hole portion 2014 aligned with the second fixing hole 1039. The positioning member 401 is then inserted into the first fixing hole 1036, the first engaging hole portion 2012, the second engaging hole portion 2014, and the second fixing hole 1039 in that order. At this time, the positioning portion 405 is partly received in the first fixing hole 1036 and partly received in the first engaging hole portion 2012; the rod 406 is partly received in the second engaging hole portion 2014 and partly received in the second fixing hole 1039. One end of the rod 406 opposite to the positioning portion 405 extends through the second fixing hole 1039 into the second receiving hole 1038. The elastic member 403 is then sleeved on the rod 406 and received in the second receiving portion 1037. The first cover 402 is connected to the rod 406 via a fixing member such as a screw 407 and is received in the second receiving portion 1037. One end of the elastic member 403 abuts the first cover 402 and the other end thereof abuts the sidewall 1033. The second cover 404 is clasped to the first receiving portion 1034.

When the positioning portion 405 is partly received in the first engaging hole portion 2012 and engages with the first engaging hole 2012, the positioning member 401 is located in a first position and is prevented from rotating. Thus, the connection arm 200 is restricted from rotating relative to the base 10. In this state, the viewing angle of the device 1 cannot be adjusted.

When the first cover 402 is pressed against spring pressure from the elastic member 403, the positioning portion 405 is driven to slide out of the first engaging hole 2012 and disengage with the connection arm 200. The positioning member 401 is located in a second position where the rod 406 is partly received in the first engaging hole 2012 and partly received in the second engaging hole 2014. Thus, the connection arm 200 may be rotated relative to the rod 406 and the viewing angle of the device 1 may be adjusted by rotating the connection arm 200. Furthermore, the first cover 402 is kept pressed until the positioning portion 405 slides out of engagement with the first fixing hole 1036. Thus, the base 10 may be rotated relative to the rod 406 and the viewing angle of the device 1 may be adjusted by rotating the base 10. The second cover 404 at this situation prevents the positioning member 401 from moving further forward. The positioning member 401 returns to its original position, and the positioning portion 405 re-engages, when the first cover 402 is released, by virtue of spring pressure from the elastic member 403.

It is to be understood, however, that even though information and the advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A support apparatus for supporting a device, comprising:
   a base;
   a main body; and
   at least one connection mechanism for rotatably connecting the base with the main body, the at least one connection mechanism comprising a positioning member capable of being inserted in the main body and the base;
   wherein the positioning member is slidable relative to the base and the main body to interchange between a first position and a second position, the positioning member is clamped to both the base and the main body to restrict the base and the main body from rotating relative to each other in the first position, and the positioning member is unclamped to the base or the main body to allow the base and the main body to rotate relative to each other when the positioning member is in the second position,
   wherein a first fixing hole is defined in the base and an engaging hole is defined in the main body to communicate with the first fixing hole, the positioning member comprises a positioning portion partly inserted in the first fixing hole and partly inserted in the engaging hole when the positioning member is in the first position,
   wherein the engaging hole comprises a first engaging hole portion communicating with the first fixing hole, the positioning portion is capable of being inserted into both the first fixing hole and the first engaging hole portion when the positioning member is in the first position,
   wherein the engaging hole comprises a second engaging hole portion communicating with the first engaging hole portion, the positioning member further comprises a rod connected to the positioning portion and being inserted in the second engaging hole portion, and
   wherein the first engaging hole portion is equal to the first fixing hole, and the second engaging hole portion is smaller than the first engaging hole portion.

2. The support apparatus as claimed in claim 1, wherein the positioning portion moves out of the engaging hole and partly inserted in the first fixing hole when the positioning member is in the second position.

3. The support apparatus as claimed in claim 1, wherein the positioning portion is polygonal, the first fixing hole and the first engaging hole portion are polygonal for allowing the positioning portion clamped therein.

4. The support apparatus as claimed in claim 1, wherein the second engaging hole portion is circular to allow the rod rotate therein.

5. The support apparatus as claimed in claim 1, wherein an opening partially surrounded by two opposite sidewalls is defined in the base to receive the main body, and the positioning member is capable of being inserted into the two opposite sidewalls and the main body to partly extend out of one of the two sidewalls in the first position.

6. A support apparatus for supporting a device, comprising:
   a first object defining a first fixing hole;
   a second object defining an engaging hole communicating with the first fixing hole; and
   at least one connection mechanism for rotatably connecting the first object with the second object, the at least one connection mechanism comprising a positioning member capable of being inserted in the first object and the second object,
   wherein the positioning member is slidable relative to the first object and the second object to interchange between a first position and a second position, the positioning member is clamped to both the first object and the second object to restrict the first object and the second object from rotating relative to each other in the first position, and the positioning member is unclamped to the first object and the second object to allow the first object and the second object to rotate relative to each other when the positioning member is in the second position,
   wherein the engaging hole comprises a first engaging hole portion communicating with the first fixing hole and a second engaging hole portion communicating with the first engaging hole portion, a diameter of the first engaging hole portion is substantially equal to a diameter of the first fixing hole, a diameter of the second engaging hole portion is substantially smaller than the diameter of the first engaging hole portion, and
   wherein the positioning member comprises a positioning portion and a rod connected to the positioning portion, the rod is inserted in the second engaging hole portion, the positioning portion is partly inserted in the first fixing hole and partly inserted in the engaging hole when the positioning member is in the first position, and the positioning portion moves out of the engaging hole to allow the first object to rotate relative to the rod when the positioning member is in the second position.

7. The support apparatus as claimed in claim 6, wherein the positioning portion is polygonal and both the first fixing hole and the first engaging hole portion are polygonal to allow the positioning portion clamped therein respectively.

8. The support apparatus as claimed in claim 6, wherein the second engaging hole portion is circular to allow the rod to rotate therein.

9. The support apparatus as claimed in claim 6, wherein the first object comprises an end portion being cut to define an opening for receiving a part of the second object, the opening is surrounded by a first sidewall and a second sidewall facing the first sidewall, the first fixing hole is defined in the first sidewall and a second fixing hole is defined in the second sidewall to communicate with the second engaging hole portion of the engaging hole.

10. The support apparatus as claimed in claim 9, wherein the rod is capable of being inserted in the second engaging hole portion and the second fixing hole and partly extended out of the second sidewall.

11. The support apparatus as claimed in claim 10, wherein an elastic member is sleeved on the part of the rod extending out of the second sidewall for providing an elastic force to drive the positioning member to move to the first position from the second position.

12. The support apparatus as claimed in claim 10, wherein a cover is connected to the part of the rod extending out of the second sidewall to prevent the positioning member from moving away from the first object and the second object.

13. The support apparatus as claimed in claim 11, wherein a receiving portion protrudes from the second sidewall for receiving the elastic member and the cover.

14. A support apparatus for supporting a device, comprising:
a base defining a first fixing hole;
a main body defining an engaging hole communicating with the first fixing hole; and
at least one connection mechanism for rotatably connecting the base with the second object, the at least one connection mechanism comprising a positioning member capable of being inserted in the main body and the base,
wherein the positioning member is slidable relative to the base and the main body to interchange between a first position and a second position, the positioning member is clamped to both the base and the main body to restrict the base and the main body from rotating relative to each other in the first position, and the positioning member is unclamped to the base and the main body to allow the base and the main body to rotate relative to each other when the positioning member is in the second position,
wherein the engaging hole comprises a first engaging hole portion communicating with the first fixing hole and a second engaging hole portion communicating with the first engaging hole portion, a diameter of the first engaging hole portion is substantially equal to a diameter of the first fixing hole, a diameter of the second engaging hole portion is substantially smaller than the diameter of the first engaging hole portion, and
wherein the positioning member comprises a positioning portion and a rod connected to the positioning portion, a diameter of the positioning portion is substantially equal to the diameter of the first fixing hole, a diameter of the rod is substantially equal to the diameter of the second engaging hole portion, the rod is inserted in the second engaging hole portion, the positioning portion is partly inserted in the first fixing hole and partly inserted in the engaging hole when the positioning member is in the first position, and the positioning portion moves out of the engaging hole to allow the base to rotate relative to the rod when the positioning member is in the second position.

15. The support apparatus as claimed in claim 14, wherein the main body comprises a support member and a connection arm with two ends thereof respectively and rotatably connected to the base and the support member via one of the connection mechanisms.

16. The support apparatus as claimed in claim 15, wherein the base comprises a bottom portion and a post protruding upwards from the bottom portion, and the post comprises an end portion away from the bottom portion and is rotatably coupled to the connection arm.

17. The support apparatus as claimed in claim 15, wherein the connection arm comprises a first engaging portion rotatably connected to the end portion and a second engaging portion opposite to the first engaging portion, the end portion is substantially arch shaped and defines an opening partially surrounded by two opposite sidewalls, and the first engaging portion is capable of being inserted in the opening.

18. The support apparatus as claimed in claim 17, wherein the support member comprises a holding portion for holding the device and a connection portion protruding from the holding portion, the connection portion is rotatably connected to the second engaging portion via one connection mechanism.

19. The support apparatus as claimed in claim 14, wherein the positioning portion is polygonal, the first fixing hole and the first engaging hole portion are polygonal for allowing the positioning portion clamped therein.

20. The support apparatus as claimed in claim 14, wherein second engaging hole portion is circular to allow the rod rotate therein.

* * * * *